United States Patent
Armangau et al.

(10) Patent No.: US 12,498,863 B2
(45) Date of Patent: Dec. 16, 2025

(54) DATA STORAGE SYSTEM EMPLOYING GREEN STORAGE TIER FOR ENERGY SAVINGS

(71) Applicant: Dell Products L.P., Round Rock, TX (US)

(72) Inventors: Philippe Armangau, Kalispell, MT (US); Vasudevan Subramanian, Chapel Hill, NC (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/228,308

(22) Filed: Jul. 31, 2023

(65) Prior Publication Data

US 2025/0044959 A1 Feb. 6, 2025

(51) Int. Cl.
*G06F 3/06* (2006.01)

(52) U.S. Cl.
CPC .......... *G06F 3/0625* (2013.01); *G06F 3/0634* (2013.01); *G06F 3/0647* (2013.01); *G06F 3/0655* (2013.01); *G06F 3/0673* (2013.01); *G06F 3/0683* (2013.01)

(58) Field of Classification Search
None
See application file for complete search history.

(56) References Cited

U.S. PATENT DOCUMENTS

| | | | |
|---|---|---|---|
| 7,330,931 B2 | 2/2008 | Le et al. | |
| 8,745,327 B1 * | 6/2014 | Throop | G06F 3/0647 |
| | | | 711/100 |
| 2010/0257312 A1 * | 10/2010 | Twigg | G06F 3/0625 |
| | | | 711/E12.001 |
| 2013/0290598 A1 | 10/2013 | Fiske et al. | |
| 2014/0324860 A1 * | 10/2014 | Rogers | G06F 3/0665 |
| | | | 707/736 |
| 2015/0095671 A1 * | 4/2015 | Hu | G06F 1/3268 |
| | | | 713/320 |
| 2016/0154601 A1 * | 6/2016 | Chen | G06F 3/067 |
| | | | 711/111 |

OTHER PUBLICATIONS

Colarelli et al. "Massive Arrays of Idle Disks For Storage Archives." Nov. 2002. IEEE. SC '02.*
Chai et al. "Efficient Data Migration to Conserve Energy in Streaming Media Storage Systems." Nov. 2012. IEEE. IEEE Transactions of Parallel and Distributed Systems. vol. 23. pp. 2081-2093.*

* cited by examiner

*Primary Examiner* — Nathan Sadler
(74) *Attorney, Agent, or Firm* — BainwoodHuang

(57) ABSTRACT

A data storage system is operated for reduced power consumption, including regularly scanning usage patterns of data stored on a set of production storage devices to identify cold data whose usage is below a predetermined usage threshold, and adding the cold data of each scan to a collection of cold data. The production storage devices are operated in a normal power mode having normal per-device power consumption. Upon the collection of cold data reaching a predetermined size, (1) one of the production storage devices is designated as a green tier device, and (2) the collection of cold data is moved to the green tier device. The green tier device is operated in a low power mode having a lower per-device power consumption.

18 Claims, 2 Drawing Sheets

DATA STORAGE SYSTEM EMPLOYING GREEN STORAGE TIER FOR ENERGY SAVINGS

BACKGROUND

The invention is related to the field of data storage systems.

SUMMARY

A method is disclosed of operating a data storage system for reduced power consumption, which includes regularly scanning usage patterns of data stored on a set of production storage devices to identify cold data whose usage is below a predetermined usage threshold, and adding the cold data of each scan to a collection of cold data. The production storage devices are operated in a normal power mode having normal per-device power consumption. Upon the collection of cold data reaching a predetermined size, (1) one of the production storage devices is designated as a green tier device, and (2) the collection of cold data is moved to the green tier device. Existing non-cold data may be removed from the green tier device, or it may have previously been removed at a time of establishing the green tier. Subsequently the green tier device is operated in a low power mode having a lower per-device power consumption, while the other production storage devices continue to operate as working devices in the normal power mode.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Overview

The present disclosure is focused on improvements to data storage systems to reduce power and energy consumption. A separate data storage tier is defined, not based on the media (device) type, but rather based on the goal of lowering power consumption based on data access pattern. More specifically, very "cold" (rarely accessed) data can be placed on a set of dedicated devices that form a "green tier". Once data is moved to the devices forming the green tier, those devices can be powered off or put in a low-power state that reduces energy consumption. The technique differs from known tiering policies which are "media type" oriented. Here all the devices available for green tier could be of the same or similar types (in terms of performance and general power consumption, for example), and they become differentiated only with respect to whether or not they store cold data.

The technique preferably leverages existing power management functions of the storage devices. Once a device have been filled with cold data then power management is used to reduce power consumption by putting the device in a low-power state (e.g., a "hibernate" state). Operation involves tracking data usage and collecting some quantity of cold data, which may be based on a desired quantity of devices to be assigned to a green tier group. Once enough cold data is collected, the green tier manager moves the data to the green tier device(s), which are then placed in the low-power operating state. If more cold data is identified, the green tier manage may dedicate another set of device to the green tier and repeat the process.

Other more detailed aspects of operation are described further below

A simple numerical example can demonstrate the energy-saving effect. A typical SSD-based storage device may use about 20 W in normal operating mode, and as little as 5 W in a low-power operating mode. If a 6+2 green tier is created (8 devices), power saving would be 8*15 W=120 W. For an installed base of 50k systems with 50% assumed to store sufficient cold data, the power saving could translate to a reduced $CO_2$ emissions equivalent to the $CO_2$ emissions of approximately 1,300 cars.

Embodiments

Figure 1:
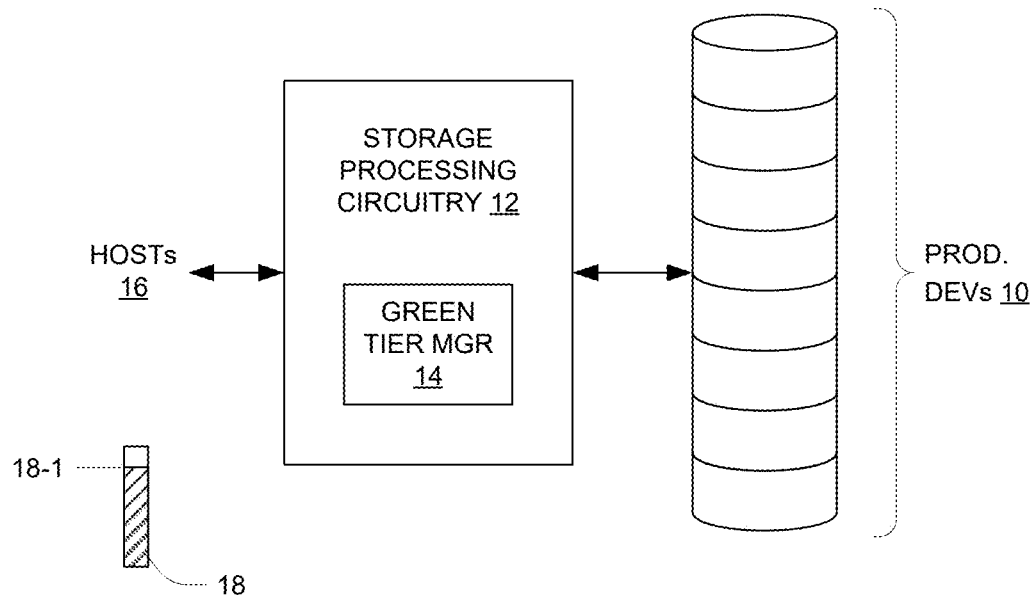
FIGS. 1 and 2 are schematic block diagrams of a data storage system employing a green storage tier.

FIG. 1 shows a schematic block diagram of a data storage system that includes a set of production storage devices (PROD DEVs) 10 and storage processing circuitry 12 which includes a green tier manager (MGR) component 14. In operation as generally known, the data storage system provides secondary data storage services for a set of host computers (HOSTs) 16. The production storage devices 10 may be any of several types as generally known (e.g., Flash-based versus magnetic-disk based), and they may all be essentially identical or may have a more heterogeneous composition. In the present context it is assumed that each device 10 has at least two operating modes, namely a normal operating mode and a low-power operating mode. In the normal operating mode, a device 10 provides a certain level of performance (i.e., latency and bandwidth of handling data read and write operations) and consumes a certain level of power. In the low-power operating mode, a device 10 consumes considerably less power and provides a much lower level of service, to the point of no service at all (e.g., a "hibernate" mode in which it is essentially inaccessible, other than to be awakened back into its normal operating mode for data operations to occur).

FIG. 1 also illustrates an initial operating state of the data storage system in which all devices 10 are working devices being operated in their normal operating modes. The system is consuming a first level of power accordingly, as indicated by schematic indicator 18 showing a first, relatively high, operating power 18-1.

It will be appreciated that a production device 10 is typically implemented from underlying devices organized into a RAID group. For such system, it will be understood that the term "device" herein refers to a RAID group that implements a RAID device.

Figure 2:
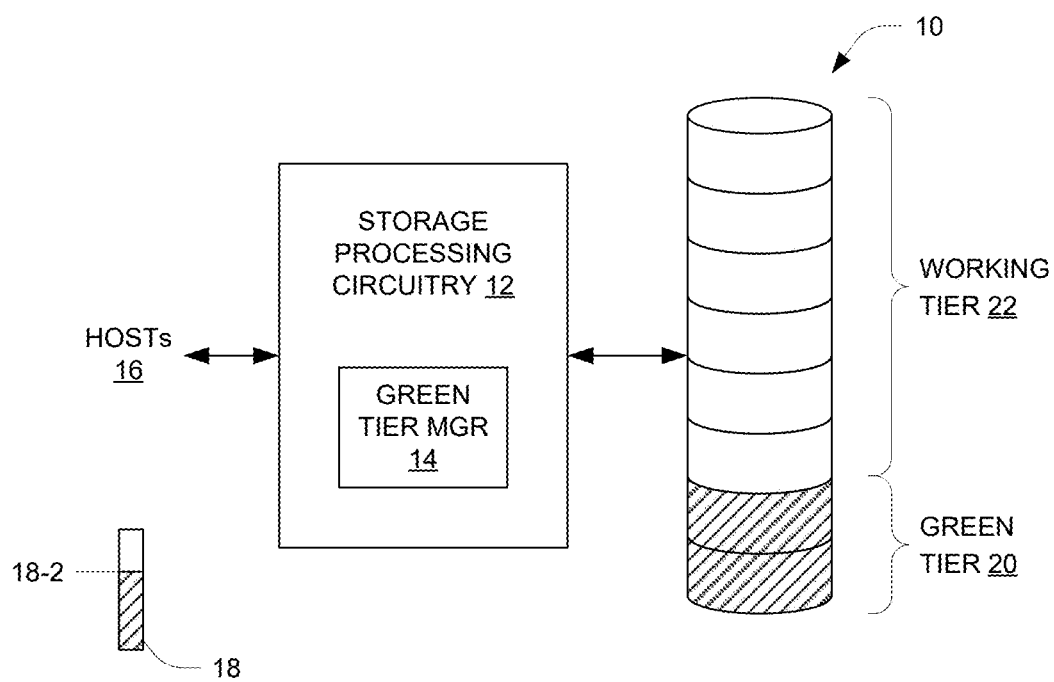

FIG. 2 illustrates a second operating state of the data storage system in which two of the devices 10 have been designated as green tier devices 20 and have entered their low-power operating modes, while the other devices 10 remain as working tier devices 22. The system is now consuming a second lower level of power accordingly, as indicated by schematic indicator 18 showing a second, relatively lower, operating power 18-2. Operation in this second operating state may proceed generally indefinitely, subject to future transitions as described more below, such that significant energy savings can be realized over an extended operating period.

The remaining description is focused on the manner transitioning a device 10 into the green tier 20, as well as other related operations to handle additional operating circumstances. It is assumed that overall the green tier manager 14 is enable/activated so that green-tier functionality is utilized in order to realize energy savings. It will be appreciated that such activation may be user-controlled in some manner, such that it can be selectively enabled and disabled to provide flexibility in system deployments.

Figure 3:
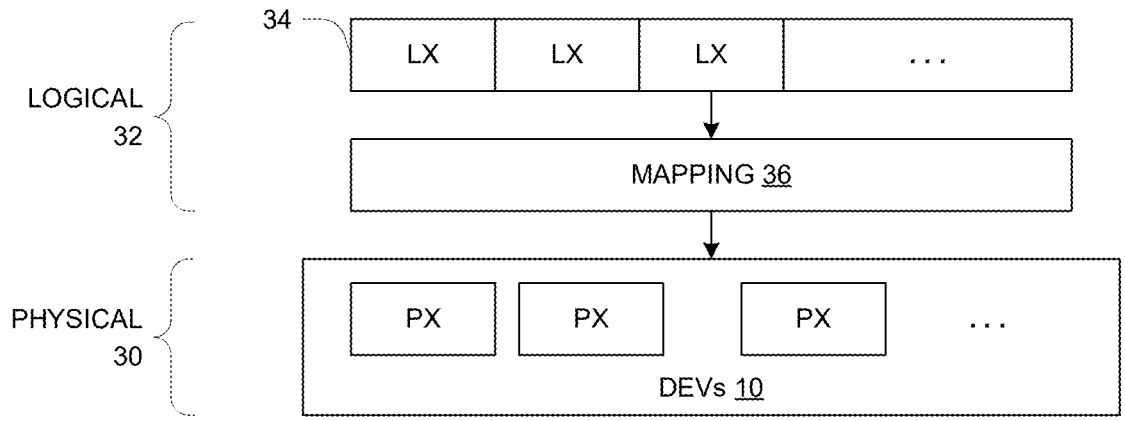
FIG. 3 is a schematic depiction of logical and physical layers of storage based partly on fixed-size extents.

FIG. 3 illustrates a dual logical/physical aspect to operation of the data storage system. At a physical layer 30, data is stored by the devices 10 in fixed-size contiguous "extents" of data, such as 2 MB extents for example. Generally an extent will include multiple "blocks", which are the lowest-level data units managed by a file system for example. These are shown as "PX" for "physical extent" at the physical layer 30. At an upper logical layer 32, stored data is organized into logical devices that are presented (directly or indirectly) to the hosts 16 (FIG. 1). FIG. 3 shows an example logical device as a volume 34, which consists of a sequential series of logical extents (LX). The storage system employs a mapping component 36 to translate between the volume organization 34 and the underlying set of physical extents PX of the physical layer 30. At any given time, the mapping for a given volume 34 may be essentially arbitrary, i.e., the physical extents potentially scattered across multiple physical devices 10 with little or no contiguity or ordering, although as known in the art there are processes for consolidating and ordering physical extents for efficiency and performance reasons. Of particular relevance in the present context is the ability for physical extents of a given volume 34 to be placed on different devices 10, as this is an important aspect of operations related to the green tier 20, as described more below.

Figure 4:
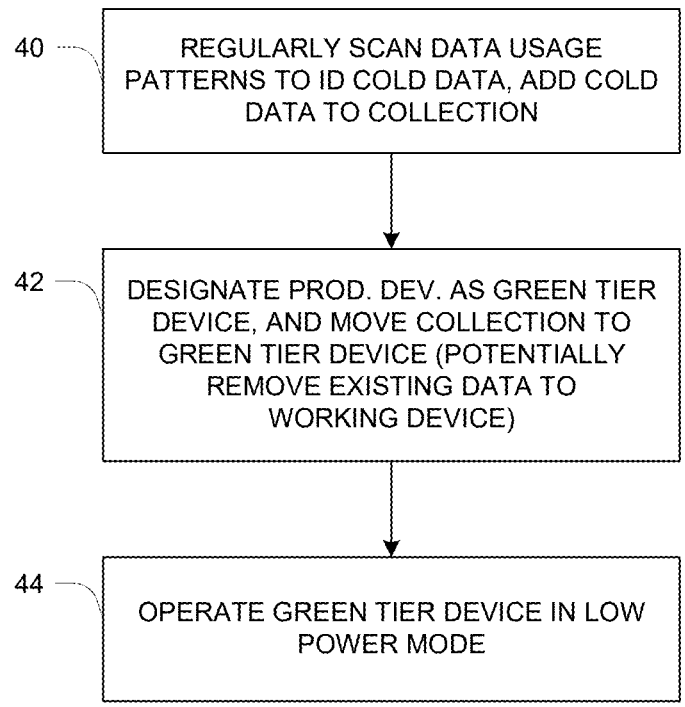
FIG. 4 is a flow diagram of operation of a green tier manager to identify and collect cold data and move it to a green tier storage device.

FIG. 4 is a flow diagram of certain basic operation for green tiering, namely a process of carving out a production device 10 for use in the green tier 20 rather than the working tier 22. Other related processes and refinements are also described below. The process of FIG. 4 is largely controlled by the green tier manager 14, using other operating components realized by the storage processing circuitry 12 as may be noted (e.g., components for monitoring data access, components for moving and remapping data extents). The process may be a largely background process, perhaps with some scheduling to take advantage of periods of low regular demand. Also, it is assumed that the devices 10 have their own independent power-mode control circuitry by which they switch between operating modes automatically, such as for example entering the low-power mode after some period of inactivity and re-entering normal-power mode upon a new access. Alternatively or in addition, the devices 10 may be capable of receiving power control commands from the storage processing circuitry 12 to effect changes in their operating modes.

At 40, the green tier manager 14 regularly scans usage patterns of data stored on a set of production storage devices (e.g., devices 10) to identify cold data whose usage is below a predetermined usage threshold, and adds the cold data of each scan to a collection of cold data. This operation occurs as the production storage devices are operated in a normal power mode having normal per-device power consumption. The scanning interval may be on the order of once per day, for example, and may vary in different embodiments. Generally some level of data granularity will be utilized, which is assumed to be extent-level granularity in this description but could be other units in other embodiments. That is, the system has the ability to track access of individual physical extents PX in ongoing regular storage operations. One benefit of extent-level granularity is that it dovetails with the extent-level mapping functionality of the mapping component 36 (i.e., there is already a mechanism for variable placement of physical extents). The threshold for "cold" is another important parameter. In one example, an extent may be deemed "cold" if it has not been accessed for some predefined period such as 30 days for example. This threshold may be different in different embodiments, and it may or may not be configurable.

At 42, the green tier manager 14 determines whether the collection of cold data has reached some predetermined size that justifies adding a new device 10 to the green tier 20 for cold data storage. This size threshold could be an absolute amount, such as some number of GB for example, or a relative amount such as a percentage of the capacity of a new RAID group (e.g., 10%). When the size threshold is satisfied, then the green tier manager 14 designates one of the production storage devices 10 as a green tier device 20 and moves the collection of cold data to the new green tier device 20 (i.e., by copying the data and making suitable changes to the mapping maintained by mapping component 36. At this point, any existing non-cold data may be removed to one or more other devices 10, i.e., to one or more of the remaining working devices 22. Alternatively, such removal of existing data may have already occurred, such as when establishing the green tier. As noted below, in subsequent iterations when a green tier device already exists and can accommodate more data, then such removal of non-cold data will generally be unnecessary.

At 44, the system subsequently operates the green tier device 20 in a low power mode having a lower per-device power consumption, while continuing to operate the other production storage devices as working devices in the normal power mode. As noted above, this transition of the new green tier device 20 into low-power mode may be automatic or in response to control input from the green tier manager 14. The ongoing low-power operation of the green tier device(s) 22 helps the system realize desired energy savings over an extended period of operation.

The green tier manager 14 generally continues to perform the scanning/collecting operation 40 and data moving at 42 indefinitely, always against the set of working devices 22 operating in their normal operating modes. As mentioned, if a non-full green tier device 22 is already identified, then a new collection of cold data may be added to that device rather than requiring designation of a new one. If a green tier device 22 exists but is full or otherwise unavailable, then the process of FIG. 4 may be used to establish another green tier device 22 and an initial collection of cold data.

As noted above, there may be additional considerations and related operations, including:
1. When cold data is accessed on read, the green-tier device 20 that is involved may toggle into regular power mode and then toggle back into low-power state. If a high level of mode toggling is detected (e.g., above some preset threshold), the green tier manager 14 may decide to redesignate a green tier device 20 as a working tier device 22 without moving the data, to avoid future mode toggling.
2. If cold data is deleted or unmapped, and a green tier device 20 becomes under-utilized (free capacity), then the green tier manager 14 may decide to redesignate the green tier device 20 as a working tier device 22 without moving the data.
3. The green tier manager 14 may also have to consider other factors including:

(A) The current wear level of devices: It may be desirable to favor the use of higher-wear-level devices 10 for use as green tier devices 20. Assigning such devices 10 as green tier devices 20 would be useful because they will get less writes as compared to the working tier 22. Another possibility is that if the green tier 20 is possibly from newer devices and its existing wear level is low, it might be beneficial to reconsider green tier for these devices to protect the wear-level of the production tier drives which are receiving all the writes.

(B) The capacity utilization of the system: Moving cold data to a dedicated device 20 may involve expensive operations in terms of resource usage, e.g. moving out the devices used for future green tier 20. If the utilization of the system is too high then it would be too expensive to do so.

As noted above, the present description assumes an example data granularity of an extent. In any given embodiment an extent may or may not be the same unit also used for mapping. Also, the extent size may vary as noted, within practical limits as will be appreciated by those skilled in the art. There is a general tradeoff between accuracy/precision (achieved with smaller extent sizes) and operational efficiency (tiering operations generally more efficient for larger extent sizes). Practical limits on extent size may be 1 MB minimum and 100 MB maximum in a typical system in 2023. As storage density continues to increase over time, larger extent sizes may be adopted as increasing efficiency without unduly sacrificing accuracy.

While various embodiments of the invention have been particularly shown and described, it will be understood by those skilled in the art that various changes in form and details may be made therein without departing from the scope of the invention as defined by the appended claims.

What is claimed is:

1. A method of operating a data storage system for reduced power consumption, comprising:
    regularly scanning usage patterns of data stored on a set of production storage devices to identify cold data whose usage is below a predetermined usage threshold, and adding the cold data of each scan to a collection of cold data, the production storage devices being operated in a normal power mode having normal per-device power consumption;
    upon the collection of cold data reaching a predetermined size, (1) designating one of the production storage devices as a green tier device, and (2) moving the collection of cold data to the green tier device;
    wherein the scanning, adding, and moving are performed on a per multi-block physical extent basis; and
    subsequently operating the green tier device in a low power mode having a lower per-device power consumption, while continuing to operate the other production storage devices as working devices in the normal power mode,
    and further including, during the operating of the green tier device in the low-power mode, (3) monitoring capacity utilization of the green tier device, and (4) directly in response to the capacity utilization falling below a threshold as indicated by the monitoring, re-designating the green tier device as a working device and initiating operation in the normal power mode.

2. The method of claim 1, including ongoing subsequent repetitions of the scanning, adding, and moving steps using the green tier device designated in the designating step.

3. The method of claim 1, further including, based on subsequent regular access of stored data, toggling the green tier device into the normal power mode for the data access and then toggling the green tier device back into the low power mode.

4. The method of claim 3, further including (1) monitoring ongoing toggling of the power mode for additional data accesses, and (2) based on the amount of the toggling exceeding a threshold, re-designating the green tier device as a working device and initiating operation in the normal power mode.

5. The method of claim 1, wherein designating one of the production storage devices as a green tier device includes preferentially selecting a device having a higher wear level among the production storage devices.

6. The method of claim 1, performed based on an estimated impact on performance of the production devices for ongoing data storage operations.

7. The method of claim 1, wherein the production devices are of the same type with respect to performance and power consumption when operating in their normal operating modes.

8. The method of claim 1, wherein the production devices are RAID devices each realized by a respective RAID group of underlying physical devices.

9. The method of claim 1, wherein the scanning interval is on the order of one day.

10. The method of claim 9, wherein the extended multi-interval period is on the order of 30 days.

11. A data storage system comprising a set of production storage devices and storage processing circuitry implementing a green tier manager, the green tier manager being configured and operative to reduce power consumption of the data storage system by:
    regularly scanning usage patterns of data stored on a set of production storage devices to identify cold data whose usage is below a predetermined usage threshold, and adding the cold data of each scan to a collection of cold data, the production storage devices being operated in a normal power mode having normal per-device power consumption;
    upon the collection of cold data reaching a predetermined size, (1) designating one of the production storage devices as a green tier device, and (2) moving the collection of cold data to the green tier device;
    wherein the scanning, adding, and moving are performed on a per multi-block physical extent basis; and
    subsequently operating the green tier device in a low power mode having a lower per-device power consumption, while continuing to operate the other production storage devices as working devices in the normal power mode,
    and wherein the green tier manager is further operative, during the operating of the green tier device in the low-power mode, (3) to monitor capacity utilization of the green tier device, and (4) directly in response to the capacity utilization falling below a threshold as indicated by the monitoring, re-designate the green tier device as a working device and initiating operation in the normal power mode.

12. The data storage system of claim 11, wherein the green tier manager further performs ongoing subsequent repetitions of the scanning, adding, and moving steps using the green tier device designated in the designating step.

13. The data storage system of claim 11, wherein the green tier manager is further operative, based on subsequent regular access of stored data, to toggle the green tier device into the normal power mode for the data access and then toggle the green tier device back into the low power mode.

14. The data storage system of claim 13, wherein the green tier manager is further operative (1) to monitor for ongoing toggling of the power mode for additional data accesses, and (2) based on the amount of the toggling exceeding a threshold, re-designate the green tier device as a working device and initiating operation in the normal power mode.

15. The data storage system of claim 11, wherein designating one of the production storage devices as a green tier device includes preferentially selecting a device having a higher wear level among the production storage devices.

16. The data storage system of claim 11, wherein the operations of the green tier manager are performed based on an estimated impact on performance of the production devices for ongoing data storage operations.

17. The data storage system of claim 11, wherein the production devices are of the same type with respect to performance and power consumption when operating in their normal operating modes.

18. The data storage system of claim 11, wherein the production devices are RAID devices each realized by a respective RAID group of underlying physical devices.

* * * * *